United States Patent [19]
Seitz

[11] Patent Number: 4,819,849
[45] Date of Patent: Apr. 11, 1989

[54] TRACTOR WITH LOCKING ACTION

[75] Inventor: Karl G. Seitz, Goshen, Conn.

[73] Assignee: Data Motion, Inc., Torrington, Conn.

[21] Appl. No.: 137,260

[22] Filed: Dec. 22, 1987

[51] Int. Cl.[4] .............................................. G03B 1/22
[52] U.S. Cl. .............................................. 226/74
[58] Field of Search .............................. 226/74, 75; 400/616-616.3

[56] References Cited

U.S. PATENT DOCUMENTS 4,129,239 12/1978 Hubbard .
4,130,230 12/1978 Seitz .
4,194,660 3/1980 Seitz .
4,199,091 4/1980 Hubbard .............................. 226/74
4,315,585 2/1982 Seitz .
4,469,262 9/1984 Seitz .
4,469,263 9/1984 Seitz .
4,566,618 1/1986 Seitz et al. .
4,569,468 2/1986 Neer .............................. 226/74

*Primary Examiner*—Daniel P. Stodola
*Assistant Examiner*—Lynn M. Sohacki

[57] ABSTRACT

A sheet feed tractor of the type used in printers for automatically advancing paper and the like has a recess in one surface of the chassis about the passage for the support shaft and axially extending, resiliently deflectable fingers in the recess and through which the support shaft will pass. The fingers are disposed in substantially alignment with the drive belt and are deflected inwardly by a rotatable clamping member disposed thereabout to effect clamping action on the support shaft substantially in alignment with the drive belt. This orientation of the clamping action precludes inadvertent movement of the tractor on the support shaft during clamping of the tractor thereon and also eliminates undesirable torque on the tractor when the tractor is operating by essentially eliminating any moment arm between the clamped area and the center line of the drive belt.

14 Claims, 2 Drawing Sheets

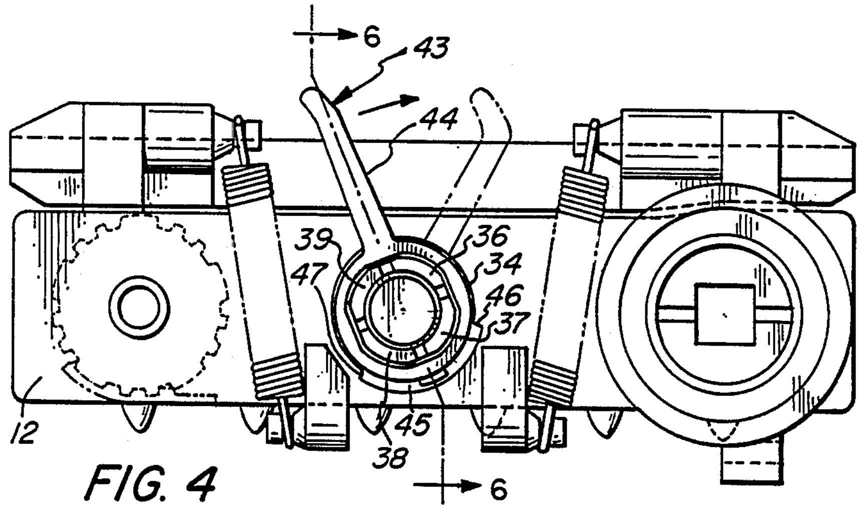
FIG. 4
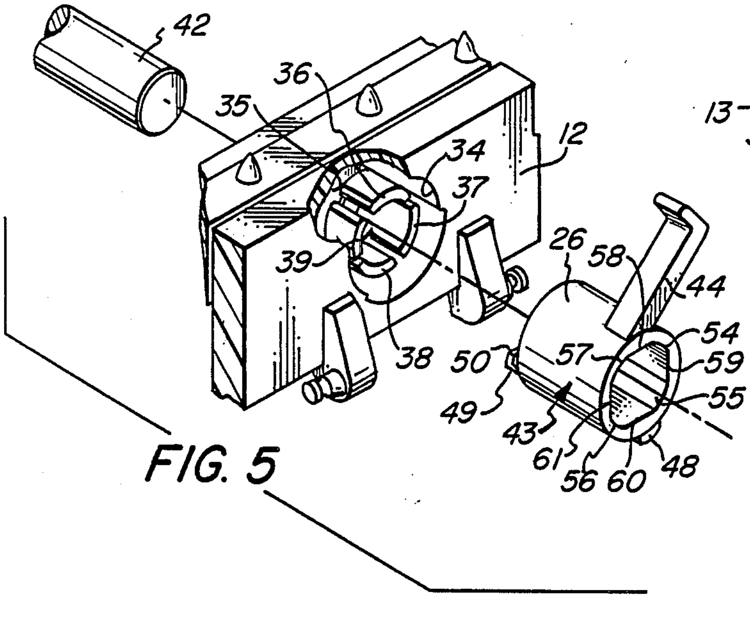
FIG. 5
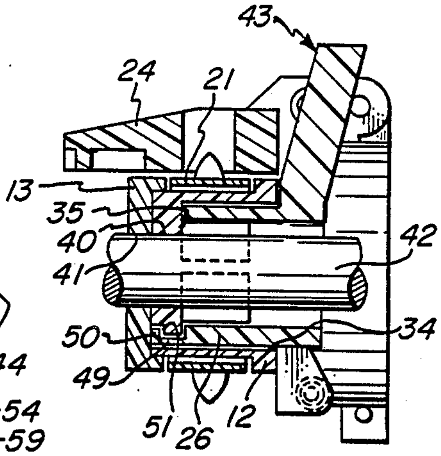
FIG. 6
FIG. 7
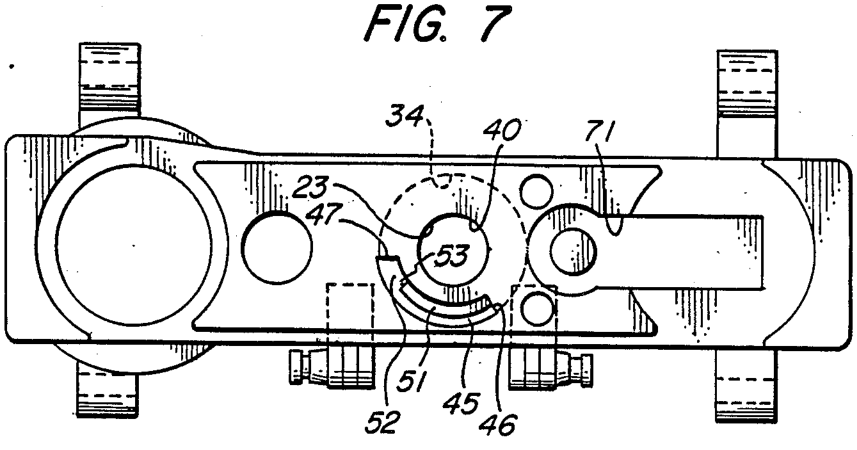

TRACTOR WITH LOCKING ACTION

FIELD OF THE INVENTION

This invention relates to web feed tractors of the type used in printers and the like for advancing perforated webs of paper and, more particularly, to such tractors having means for clamping the tractor on the support shaft of the printer mechanism.

BACKGROUND OF THE INVENTION

The typical tractor includes a continuous drive belt rotatably mounted on the tractor body and driven by a drive sprocket which is rotated by the drive shaft of the printer mechanism In operation, most tractors have projecting pins on the outer surface of the moving drive belt which engage in perforations in the paper web and advance it as the lines of print are formed thereon.

The tractors are typically used in pairs disposed along the side edges of the perforated web. Spaced from and parallel to the drive shaft is a support shaft, and the tractors are slidable on both shafts to adjust the spacing therebetween. Because sheet material webs of different widths may be used, it is desirable that the tractors permit clamping and unclamping to be performed with relative ease.

Most clamping mechanisms are disposed to one side of the body of the tractor, i.e., offset to one side of the centerline of travel of the belt. When the shafts are not perfectly straight, this may result in canting from the desired orientation or produce torque upon rotation of the drive shaft as the center-to-center spacing varies due to aberrations in one or both shafts. Moreover, the act of clamping may cause the body to move slightly on the support and drive shafts from the desired position of alignment of the centerline of the drive belt in the centerline of the perforations in the web. This could occur if the clamping force exerts a force on the support shaft which is axially disposed from the centerline, and this can even induce minor movement of the tractor on the support shaft.

Additionally, when the clamping action is axially displaced from the centerline of the belt, a moment arm exists between the point of clamping and the center line or drive axis of the belt. This may produce "creep" of the tractor on the support shaft due to the torque produced by the drive belt.

Accordingly, it is an object of the present invention to provide a tractor with an improved clamping mechanism located within the body of the tractor.

It is also an object to provide such a tractor in which the components may be readily fabricated and assembled.

Another object is to provide such a tractor which may be readily clamped and unclamped and which is rugged and long lived in operation.

SUMMARY OF THE INVENTION

It has now been found that the foregoing and related objects may be readily attained in a drive tractor for web material which is adapted to be slidably mounted on substantially parallel extending support and drive shafts of a printer assembly. The tractor includes a tractor chassis having a pair of spaced passages extending transversely therethrough, and a drive sprocket rotatably mounted in one of the passages in the tractor body and adapted to receive an associated drive shaft for sliding therealong and for driving engagement therewith upon rotation of the associated drive shaft about its longitudinal axis. An endless belt is disposed about the tractor chassis in engagement with the drive sprocket to be driven thereby upon rotation of the sprocket by the associated drive shaft. The outer surface of the belt is adapted to engage the web material and advance it through the tractor upon driving motion of the drive belt by the sprocket.

Clamping means is provided about the other of the passages in the chassis for clamping the chassis to the associated support shaft. It includes a generally annular recess in one surface of the chassis about the other passage and the recess is defined by an end wall and a circumferential wall. A plurality of resiliently deflectable fingers are formed integral with and project from the end wall of the recess and define a portion of the passage for the support shaft. The fingers are spaced from the circumferential wall of the recess, and a rotatable clamping member has a generally cylindrical body portion which is disposed within the recess about the fingers. The body portion has interior cam surfaces which, in a first rotated position of the clamping member, flex the fingers inwardly to clamp the associated support shaft extending therethrough, and, in a second position, release the fingers from such deflection to permit the chassis to slide on the associated support shaft and the drive shaft.

In its preferred form, the chassis has an arcuate slot extending therethrough contiguous with the circumference of the recess and the clamping member has an axially projecting arm at the inner end of the body portion which extends through the slot. The arm has a finger at its free end which is slidably engaged with the opposite surface of the chassis, and the clamping member is captured in the recess and is rotatable therein between limits defined by the slot. An actuator arm is provided on the clamping member outwardly of the one surface of the chassis to effect manual rotation of the clamping member between the two positions. Desirably, the tractor includes means for limiting rotation of the clamping member in either direction of rotation.

In the usual form, the fingers are located within the body and extend transversely the longitudinal dimension of the endless belt.

The interior surfaces of the clamping member comprise spaced arcuate surfaces which are defined by a common radius greater than the radius defining the arcuate outer surfaces of the fingers, and flat chordal surfaces therebetween which are defined by a radial distance smaller than the radius of the arcuate surface of the fingers. The chordal surfaces deflect the fingers inwardly when the clamping member is in the first or clamping position.

The opposite surface of the chassis has an arcuate flange adjacent the slot and on which the finger is slidably seated and which defines the limits of rotation of the clamping member upon assembly. Usually, the slot has an enlarged portion at one end thereof for passage of the arm and finger through the chassis, and the tractor has means for closing the enlarged portion to lock the arm in assembly.

BRIEF DESCRIPTION OF THE DRAWINGS

FIG. 4 is an elevational view of the side of the tractor opposite that seen in FIG. 2 with the clamping member shown in phantom line in its releasing position;

FIG. 5 is a fragmentary and partially exploded view of the tractor;

FIG. 6 is a sectional view along the line 6—6 of FIG. 4; and

FIG. 7 is a side elevational view of the tractor chassis with the cover removed.

DETAILED DESCRIPTION OF THE ILLUSTRATED EMBODIMENT

Figure 1:
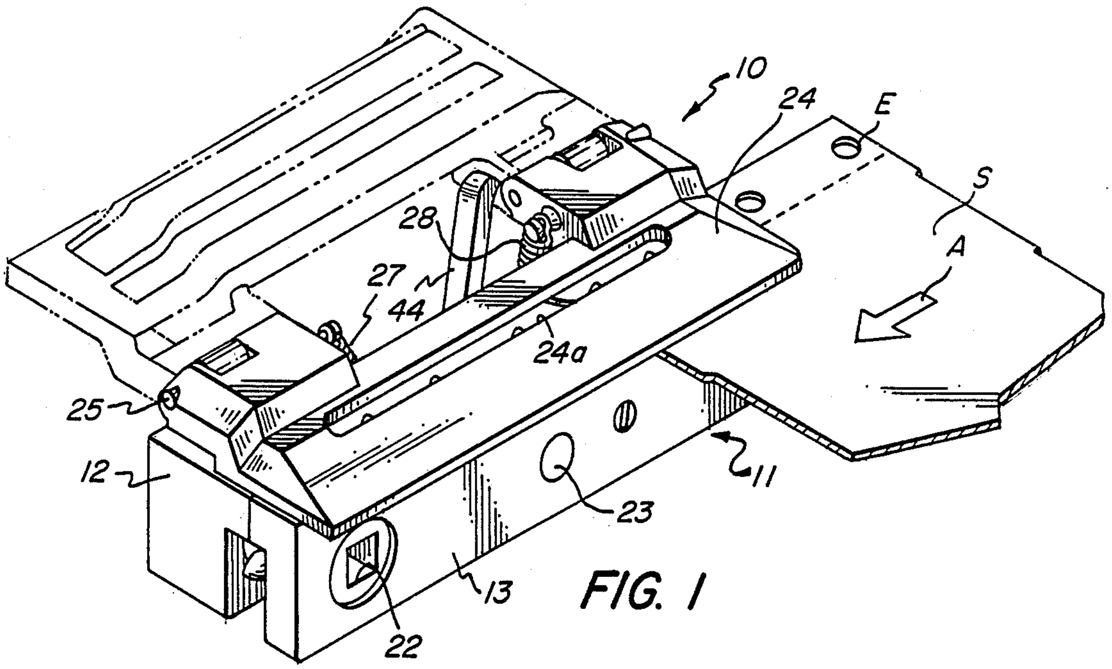
FIG. 1 is a perspective view of a tractor embodying the present invention, with the top cover also shown in phantom line in an open position and with a paper web fragmentarily illustrated.
Figure 2:
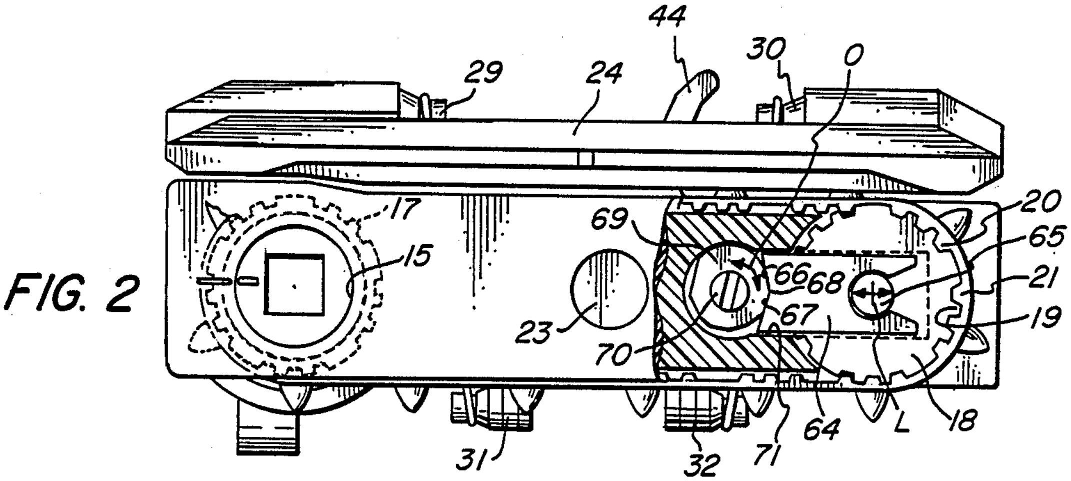
FIG. 2 is a side elevational view of the tractor of FIG. 1 with the side cover and a portion of the chassis and clamping member partially broken away to reveal internal structure.
Figure 3:
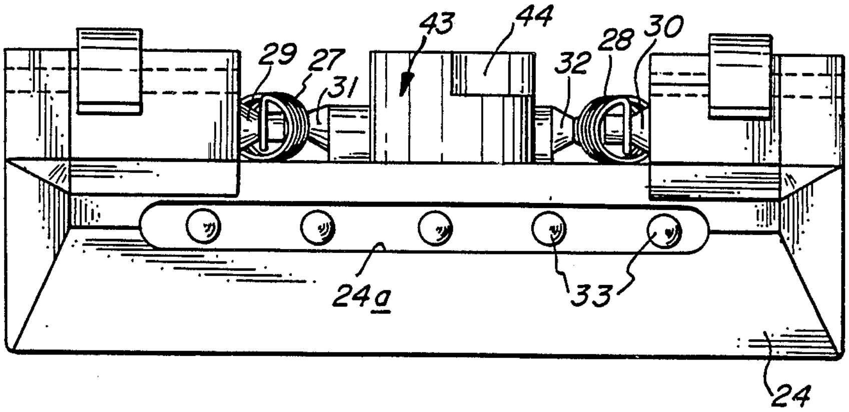
FIG. 3 is a top plan view of the tractor of FIG. 1.

Turning first to FIGS. 1-3, therein illustrated is a tractor generally designated by the numeral 10 and comprising a body generally designated by the numeral 11 provided by the chassis 12 and cover 13. Rotatably mounted on the body 11 are a drive pulley 15 having drive teeth 17 about its periphery, and an idler pulley 18 also having drive teeth 19 about its periphery. The teeth 17 and 19 of pulleys 15 and 18 engage teeth 20 on the inner surface of the endless drive belt 21.

A rectangular passage 22 extends through the drive pulley 15 and receives a drive shaft (not shown) of rectangular cross section. A circular passage 23 extends through the members 12 and 13 and receives the support shaft 42 seen fragmentarily in FIGS. 5 and 6. The tractor 10 also includes a top cover or paper guide 24 shown in an closed position in full line in FIG. 1, and in the open position in broken line. The top cover or paper guide 24 is hingedly mounted on the chassis 12 by the hinge pins 25, and is held in the open and closed positions by over center springs 27 and 28 acting between the seats 29 and 30, respectively, on the cover 24, and seats 31 and 32 on the lower portion of the chassis 12.

As shown in FIG. 1, the belt 21 is drivingly engaged with a paper web S having perforated edges E along its margins, and it moves paper web S in the direction of the arrow A. The drive pins 33 on the outer surface of the belt 21 enter the perforations E and transport the paper web S through the tractor 10. An elongated aperture 24a in the top cover or guide member 24 receives the pins 33 as they travel along the rectilinear path of the belt 21.

Reference is now made to FIGS. 4-7 wherein it can be seen that the chassis 12 is integrally formed with a generally annular recess 34 surrounding the passage 23 and extending inwardly in its side face opposite from that against which the cover member 13 is disposed. The recess 34 terminates in an end wall 35, and fingers 36, 37, 38, and 39 project from the end wall 35 about the inner periphery of the recess 34. The fingers 36-39 comprise arcuate segments which cooperate with the aperture 41 in the remainder of the chassis 13 to define the through passage 23 for the support shaft 42.

A clamping member generally designated by the numeral 43 has a generally cylindrical body portion 26 which extends into the recess 34 between its peripheral wall and the fingers 36-39. At the outer end of the body portion 26 is a laterally extending actuator arm or lever 44.

As best seen in FIG. 7, the chassis 12 also has an arcuate slot 45 extending therethrough continuous to, and extending about, a portion of the outer periphery of the annular recess 34, and the slot has an enlarged portion 52 at one end thereof which projects radially inwardly. The opposite surface of the chassis 12 is provided with an arcuate flange 51 inwardly of, and contiguous to, the flange 45. At a point spaced about the periphery from the actuating arm 44, the body portion 26 of the clamping member 32 has a boss 48 extending axially of its length and this seats in the portion of the slot 45 outwardly of the end wall 35. At the end of the boss 48 is an axially ending arm 49 with an upturned finger 50, and this arm 49 projects through the slot 45 and its finger 50 seats on the arcuate flange 51 on the opposite surface of the chassis 12.

To effect assembly, the clamping member 43 is inserted into the recess 34 with the arm 49 positioned to pass through the enlarged portion 52 of the slot 45, and the clamping member 43 is fully seated so that the body portion 26 bottoms against the end wall 35. The clamping member 43 is then rotated until the finger 50 is disposed against the shoulder provided by the arcuate flange 51. The side cover 13 may then be assembled to chassis 12, and it has a projecting boss (not shown) which fills the enlarged portion 52 of the slot 45 and thereby prevents clamping member 43 from being rotated past the end 53 of the flange 51, thus capturing clamping member 43 in assembly.

As seen in FIG. 4 and 5, the inner periphery of clamping member 43 is partially defined by four spaced arcuate segments 54, 55, 56 and 57 having a radius slightly greater than that of the outer arcuate surfaces of the fingers 36-39. Extending rectilinearly between the ends of the arcuate surfaces 54-57 are chordal surfaces 58, 59, 60 and 61 at a radial distance less than that of the arcuate outer surfaces of the fingers 36-39.

The fingers 36-39 are of relatively thin cross section so that they may be readily deflected and resiliently recover upon release of the deflecting pressure. When clamping member 43 is in the position shown in full line in FIG. 4, the arcuate outer surfaces of the fingers 36-39 and the arcuate surfaces 54-57 will be substantially aligned, and the fingers 36-39 will not be deflected against the support shaft 42. However, when clamping member 43 is rotated to the position defined by the broken line showing in FIG. 4, the flat chordal surfaces 58-61 will be aligned with the fingers 36-39 and deflect the fingers 36-39 inwardly to clamp the support shaft 42.

Rotation of the clamping member 43 is limited in the clamped direction by the abutment of the projecting arm 49 against the shoulder 46 at one end of the slot 45 and in the unclamping direction by the projection (not shown) on cover member 13 which fills the enlarged portion 52 of the slot 45.

In FIG. 2, there is illustrated a desirable mechanism for adjusting the tension on the belt 21. Idler pulley 18 is movable longitudinally of the chassis 13 on a U-shaped yoke 64 in which it is disposed. The shaft 65 for the idler pulley 18 seats in slots in the outer end of the arms of the yoke 64 (only one arm is shown). The inner end of the yoke 64 is seated in a recess 71 in the chassis 12 and has a base of V-shaped configuration formed by the inclined surfaces 66 and 67 which converge at the apex 68. A cam member 69 is seated in the chassis 12 at the inner end of the recess 71 and abuts the inner end of the yoke 64. The cam member 69 is rotatably supported in the body 11 by the shaft 70 which extends through the cover 13 and is received in the chassis 12. The cam member 69 has its outer periphery formed as a plurality of pairs of converging flats defined by different radii which converge at apexes about the periphery thereof which are of varying radial lengths from the axis of rotation. Thus, by rotating screw 70 as shown by the arrow 0, the yoke 64 may be moved longitudinally as indicated by arrow L to position idler pulley 18 relative to the drive pulley 15 and control the tension in the belt 21. Upon release of the tensioning pressure through rotation of the screw to locate an apex of lesser radial distance against the yoke 64, the resilience of the belt 21 will move the idler pulley 18 and yoke 64 inwardly.

This structure is more fully disclosed and claimed in copending application of Arthur J. Milano, Jr., "Tractor With Belt Tensioning Mechanism" Ser. No. 135,723 filed on the Dec. 21, 1987 and assigned to the same assignee.

Thus, it can be seen that the objects of the invention set forth, as well as those made apparent from the foregoing description, are efficiently attained. Although a preferred embodiment of the invention has been set forth for purposes of disclosure, modifications to the disclosed embodiment of the invention, as well as other embodiments thereof, may occur to those skilled in the art. Accordingly, the appended claims are intended to cover all embodiments of the invention and modifications to the disclosed embodiment which do not depart from the spirit and scope of the invention.

Having thus described the invention, what is claimed is:

1. In a drive tractor for web material adapted to be slidably mounted on substantially parallel extending support and drive shafts of a printer assembly, the combination comprising:

(a) a tractor chassis having a pair of spaced passages extending transversely therethrough;

(b) a drive sprocket rotatably mounted in one of said passages in said tractor chassis and adapted to receive an associated drive shaft for sliding therealong and for driving engagement therewith upon rotation of the associated drive shaft about its longitudinal axis;

(c) an endless belt disposed about said tractor chassis in engagement with said drive sprocket to be driven thereby upon rotation of said sprocket by the associated drive shaft, the outer surface of said drive belt being adapted to engage an associated web material and advance it through the tractor upon driving motion of said drive belt by said sprocket; and (d) clamping means about the other of said passages in said chassis for clamping said chassis to the associated support shaft and including a generally annular recess in one surface of said chassis about said other passage, said recess being defined by an end wall and a circumferential wall, said clamping means also including a plurality of resiliently deflectable fingers integral with and projecting coaxially from said end wall of said recess and defining a portion of said other passage for said support shaft, said fingers being inwardly spaced from said circumferential wall of said recess, a rotatable clamping member having a generally cylindrical body portion disposed within said recess about said fingers, said body portion having interior cam surfaces which, in a first rotated position of said clamping member, flex said fingers inwardly to clamp the associated support shaft extending therethrough, and, in a second position, release said fingers from said deflection to permit said chassis to slide on the associated support shaft and said drive shaft.

2. The tractor of claim 1 wherein said chassis has an arcuate slot extending therethrough contiguous with the circumference of said recess and wherein said clamping member has an axially projecting arm at the inner end of said body portion which extends through said slot, said arm having a finger at its free end slidably engaged with the opposite surface of said chassis, said clamping member being captured in said recess and being rotatable therein between limits defined by said slot.

3. The tractor of claim 1 wherein an actuator arm is provided on said clamping member outwardly of said one surface to effect manual rotation of said clamping member between said positions.

4. The tractor of claim 1 including means for limiting rotation of said clamping member in either direction of rotation.

5. The tractor of claim 1 wherein said fingers are located in said body and extend transversely of the longitudinal dimension of with said endless belt.

6. The tractor of claim 1 wherein said interior surfaces of said clamping member comprise spaced arcuate surfaces defined by a common radius greater than the radius defining arcuate outer surfaces on said fingers and flat chordal surfaces therebetween defined by a radius smaller than said radius of said arcuate surfaces of said fingers, said chordal surfaces deflecting said fingers inwardly when said clamping member is in said first position.

7. The tractor of claim 2 wherein said opposite surface of said chassis has an arcuate flange contiguous to said slot on which said finger is slidably seated which define the limits of rotation of said clamping member upon assembly.

8. The tractor of claim 7 wherein said slot has an enlarged portion at one end thereof for passage of said arm and finger through said chassis, and said tractor includes means for filling said enlarged portion to lock said arm in assembly.

9. In a drive tractor for web material adapted to be slidably mounted on substantially parallel extending support and drive shafts of a printer assembly, the combination comprising:

(a) a tractor chassis having a pair of spaced passages extending transversely therethrough;

(b) a drive sprocket rotatably mounted in one of said passages in said tractor chassis and adapted to receive an associated drive shaft for sliding therealong and for driving engagement therewith upon rotation of the associated drive shaft about its longitudinal axis;

(c) an endless belt disposed about said tractor chassis in engagement with said drive sprocket to be driven thereby upon rotation of said sprocket by the associated drive shaft, the outer surface of said drive belt being adapted to engage an associated web material and advance it through the tractor upon driving motion of said belt by said sprocket;

(d) clamping means about the other of said passages in said chassis for clamping said chassis to the associated support shaft and including a generally annular recess in one surface of said chassis about said other passage, said recess being defined by an end wall and a circumferential wall, said clamping means also including a plurality of resiliently deflectable fingers integral with and projecting coaxially from said end wall of said recess and defining a portion of said other passage for said support shaft, said fingers being inwardly spaced from said circumferential wall of said recess, in said body and extending transversely of the longitudinal dimension of said endless belt, a rotatable clamping member having a generally cylindrical body portion disposed within said recess about said fingers, said body portion having interior cam surfaces which, in a first rotated position of said clamping member, flex said fingers inwardly to clamp the associated support shaft extending therethrough, and, in a second position, release said fingers from said deflection to permit said chassis to slide on the associated support shaft and said drive shaft, said chassis having an arcuate slot extending therethrough contiguous with the circumference of said recess and said clamping member having an axially projecting arm at the inner end of said body portion which extends through said slot, said arm having a finger at its free end slidably engaged with the opposite surface of said chassis, said clamping member being captured in said recess and being rotatable therein between limits defined by said slot, said clamping member having an actuator arm outwardly of said one surface of said chassis to effect manual rotation of said clamping member between said positions.

10. The tractor of claim 9 including means for limiting rotation of said clamping member in either direction of rotation.

11. In a drive tractor web material adapted to be slidably mounted on substantially parallel extending support and drive shafts of a printer assembly, the combination comprising:

(a) a tractor chassis having a pair of spaced passages extending transversely therethrough;

(b) a drive socket rotatably mounted in one of said passages in said tractor chassis and adapted to receive an associated drive shaft for sliding therealong and for driving engagement therewith upon rotation of the associated drive shaft about its longitudinal axis;

(c) an endless belt disposed about said tractor chassis in engagement with said drive sprocket to be driven thereby upon rotation of said sprocket by the associated drive shaft, the outer surface of said drive belt being adapted to engage an associated web material and advance it through the tractor upon driving motion of said drive belt by said sprocket;

(d) clamping means about the other of said passages in said chassis for clamping said chassis to the associated support shaft and including a generally annular recess in one surface of said chassis about said other passage, said recess being defined by an end wall and a circumferential wall, said clamping means also including a plurality of resiliently deflectable fingers integral with and projecting coaxially from said end wall of said recess and defining a portion of said other passage for said support shaft, said fingers being inwardly spaced from said circumferential wall of said recess in said body and extending transversely of the longitudinal dimension of said endless belt, a rotatable clamping member having a generally cylindrical body portion disposed within said recess about said fingers, said body portion having an interior cam surface which, in a first rotated position of said clamping member, flex said fingers inwardly to clamp the associated support shaft extending therethrough, and, in a second position, release said fingers from said deflection to permit said chassis to slide on the associated support shaft and said drive shaft, interior surfaces of said clamping member comprising spaced arcuate surfaces defined by a common radius greater than the radius defining arcuate outer surfaces on said fingers and flat chordal surfaces therebetween defined by a radius smaller than said radius of said surface arcuate surfaces of said fingers, said chordal surfaces deflecting said fingers inwardly when said clamping member is in said first position.

12. The tractor of claim 11 wherein said opposite surface of said chassis has an arcuate flange contiguous to said slot on which said finger is slidably seated and which defines the limits of rotation of said clamping member upon assembly.

13. The tractor of claim 12 wherein said slot has an enlarged portion at one end thereof for passage of said arm and finger through said chassis, and said tractor includes means for filling said enlarged portion to lock said arm in assembly.

14. The tractor of claim 11 wherein said chassis has an arcuate slot extending therethrough contiguous with the circumference of said recess and wherein said clamping member has an axially projecting arm at the inner end of said body portion which extends through said slot, said arm having a finger at its free end slidably engaged with the opposite surface of said chassis, said clamping member being captured in said recess and being rotatable therein between limits defined by said slot, said clamping member having an actuator arm thereon outwardly of said one surface to effect manual rotation of said clamping member between said positions.

* * * * *

UNITED STATES PATENT AND TRADEMARK OFFICE
CERTIFICATE OF CORRECTION

PATENT NO. : 4,819,849

DATED : April 11, 1989

INVENTOR(S) : Karl G. Seitz

It is certified that error appears in the above-identified patent and that said Letters Patent is hereby corrected as shown below:

Column 7, line 32, after "tractor" insert -- for --;
line 38, "socket" should be "sprocket";
Column 8, line 27, before "arcuate" delete "surface".

Signed and Sealed this

Thirtieth Day of April, 1991

*Attest:*

HARRY F. MANBECK, JR.

*Attesting Officer*

*Commissioner of Patents and Trademarks*